(12) United States Patent
Lee et al.

(10) Patent No.: US 12,172,237 B2
(45) Date of Patent: Dec. 24, 2024

(54) WORK TABLE FOR LASER PROCESSING AND METHOD OF OPERATING THE SAME

(71) Applicant: SAMSUNG DISPLAY CO., LTD., Yongin-si (KR)

(72) Inventors: Sungyong Lee, Seongnam-si (KR); Jaeha Lim, Hwaseong-si (KR); Gyoowan Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 272 days.

(21) Appl. No.: 17/650,051

(22) Filed: Feb. 4, 2022

(65) Prior Publication Data

US 2022/0152745 A1   May 19, 2022

Related U.S. Application Data

(62) Division of application No. 15/708,927, filed on Sep. 19, 2017, now Pat. No. 11,273,523.

(30) Foreign Application Priority Data

Dec. 5, 2016   (KR) .................. 10-2016-0164489

(51) Int. Cl.
*B23K 26/38*   (2014.01)
*B08B 5/04*    (2006.01)
(Continued)

(52) U.S. Cl.
CPC ............ *B23K 26/38* (2013.01); *B08B 5/04* (2013.01); *B08B 15/00* (2013.01); *B23K 26/16* (2013.01);
(Continued)

(58) Field of Classification Search
CPC ...... B23K 26/38; B23K 26/702; B23K 26/16; B23K 37/0408; B08B 5/04; B08B 15/00; B25B 11/005
See application file for complete search history.

(56) References Cited

U.S. PATENT DOCUMENTS 5,601,737 A      2/1997 Asahi et al.
5,618,759 A  *   4/1997 Boysel ............. H01L 21/67092
                                                          83/84
(Continued)

FOREIGN PATENT DOCUMENTS

CN      102431787     5/2012
GB       2049164     12/1980
(Continued)

OTHER PUBLICATIONS

JP 2010/142891 WIPO Patentscope Translation (Year: 2021).
CN 102431787 English Machine Translation (Year: 2012).

*Primary Examiner* — Seahee Hong
(74) *Attorney, Agent, or Firm* — F. Chau & Associates, LLC

(57) ABSTRACT

A work table for laser processing includes an upper plate including a plurality of cell regions and at least one groove region that divides the plurality of cell regions. The upper plate includes a plurality of absorption holes that fix a substrate in the plurality of cell regions. A plurality of suction holes collect particles generated during a cutting process performed on the substrate. A lower plate is disposed under the upper plate. The lower plate forms an absorption path that is coupled to the plurality of absorption holes. A suction path is coupled to the plurality of suction holes by combining the lower plate with the upper plate.

15 Claims, 7 Drawing Sheets

(51) Int. Cl.
    *B08B 15/00*     (2006.01)
    *B23K 26/16*     (2006.01)
    *B23K 26/70*     (2014.01)
    *B23K 37/04*     (2006.01)
    *B25B 11/00*     (2006.01)

(52) U.S. Cl.
    CPC ........ *B23K 26/702* (2015.10); *B23K 37/0408* (2013.01); *B25B 11/005* (2013.01)

(56) References Cited

U.S. PATENT DOCUMENTS

| | | | |
|---|---|---|---|
| 6,218,642 B1 | 4/2001 | Christmas et al. | |
| 8,040,491 B2 * | 10/2011 | Owa | G03F 7/2041 |
| | | | 355/72 |
| 9,224,632 B2 * | 12/2015 | Shibuta | G03F 7/70341 |
| 10,297,488 B2 * | 5/2019 | Fukuoka | B28D 5/0094 |
| 2003/0030188 A1 | 2/2003 | Spengler | |
| 2004/0026382 A1 | 2/2004 | Richerzhagen | |
| 2006/0016443 A1 | 1/2006 | Ohmiya et al. | |
| 2006/0081574 A1 | 4/2006 | Nagai | |
| 2006/0163224 A1 | 7/2006 | Takeda et al. | |
| 2007/0141811 A1 | 6/2007 | Sekiya et al. | |
| 2007/0151296 A1 * | 7/2007 | Huh | B65G 49/064 |
| | | | 65/182.2 |
| 2013/0196058 A1 | 8/2013 | Tokunaga et al. | |
| 2014/0014633 A1 | 1/2014 | Chen et al. | |
| 2014/0035178 A1 * | 2/2014 | Kay | D01D 5/18 |
| | | | 425/8 |
| 2014/0038392 A1 | 2/2014 | Yonehara et al. | |
| 2014/0193716 A1 | 7/2014 | L'Abee et al. | |
| 2015/0283650 A1 * | 10/2015 | Aikawa | B23K 26/032 |
| | | | 219/121.8 |
| 2016/0163580 A1 | 6/2016 | Huang | |
| 2017/0120375 A1 * | 5/2017 | Lee | B23K 26/354 |
| 2017/0120379 A1 * | 5/2017 | Choi | B23K 26/0622 |
| 2017/0212371 A1 | 7/2017 | Liu et al. | |
| 2018/0154485 A1 | 6/2018 | Lee et al. | |
| 2018/0304412 A1 * | 10/2018 | Liu | B23K 26/384 |
| 2019/0308276 A1 | 10/2019 | Suzuki et al. | |

FOREIGN PATENT DOCUMENTS

| | | |
|---|---|---|
| JP | 2000-141075 | 5/2000 |
| JP | 2010142891 | 7/2020 |
| KR | 10-2009-0069833 | 7/2009 |
| KR | 20-2009-0010264 | 10/2009 |
| KR | 10-2012-0016946 | 2/2012 |
| KR | 10-2012-0108229 | 10/2012 |

* cited by examiner

WORK TABLE FOR LASER PROCESSING AND METHOD OF OPERATING THE SAME

CROSS-REFERENCE TO RELATED APPLICATION(S)

This application is a Division of co-pending U.S. patent application Ser. No. 15/708,927, filed on Sep. 19, 2017, which claims priority under 35 USC § 119 to Korean Patent Application No. 10-2016-0164489, filed on Dec. 5, 2016 in the Korean Intellectual Property Office (KIPO), the contents of which are incorporated by reference herein in their entirety.

TECHNICAL FIELD

The present disclosure relates to a work table, and more particularly, to a work table for laser processing and a method of operating the work table.

DISCUSSION OF THE RELATED ART

In laser processing, a laser beam is used to cut a substrate, or to form a particular pattern on the substrate. Such laser processing is generally performed by arranging the substrate on a work table and irradiating the substrate with the laser beam. As the substrate is processed, the substrate and the work table may become contaminated by fine particles and fumes that are biproducts of the laser processing.

SUMMARY

A work table for laser processing includes an upper plate including a plurality of cell regions and at least one groove region that divides the plurality of cell regions. The upper plate includes a plurality of absorption holes that fix a substrate in the plurality of cell regions. A plurality of suction holes collect particles generated during a cutting process performed on the substrate. A lower plate is disposed under the upper plate. The lower plate forms an absorption path that is coupled to the plurality of absorption holes. A suction path is coupled to the plurality of suction holes by combining the lower plate with the upper plate.

A method of operating a work table for laser processing includes disposing a work table for laser processing on a base. A substrate is fixed to the work table using one or more absorption holes of the work table. The fixed substrate is cut using a laser beam. Particles generated during the cutting of the substrate are collected using one or more suction holes of the work table.

A work table includes an upper plate including a plurality of groove regions disposed in rows and columns and defining a plurality of cell regions at intersections of the plurality of groove regions. A plurality of absorption holes is disposed on the upper plate. The plurality of absorption holes is configured to fix a substrate to the upper plate with vacuum pressure while the substrate is cut using a laser. A plurality of suction holes is disposed on the upper plate. The plurality of suction holes is configured to collect particles generated during the cutting of the substrate. A lower plate is disposed under the upper plate. The lower plate is configured to define an absorption path between the lower plate and the upper plate, and to define a suction path between the lower plate and the upper plate. The absorption path is coupled to the plurality of absorption holes. The suction path coupled to the plurality of suction holes.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Hereinafter, the present inventive concept will be explained in detail with reference to the accompanying drawings.

Figure 1:
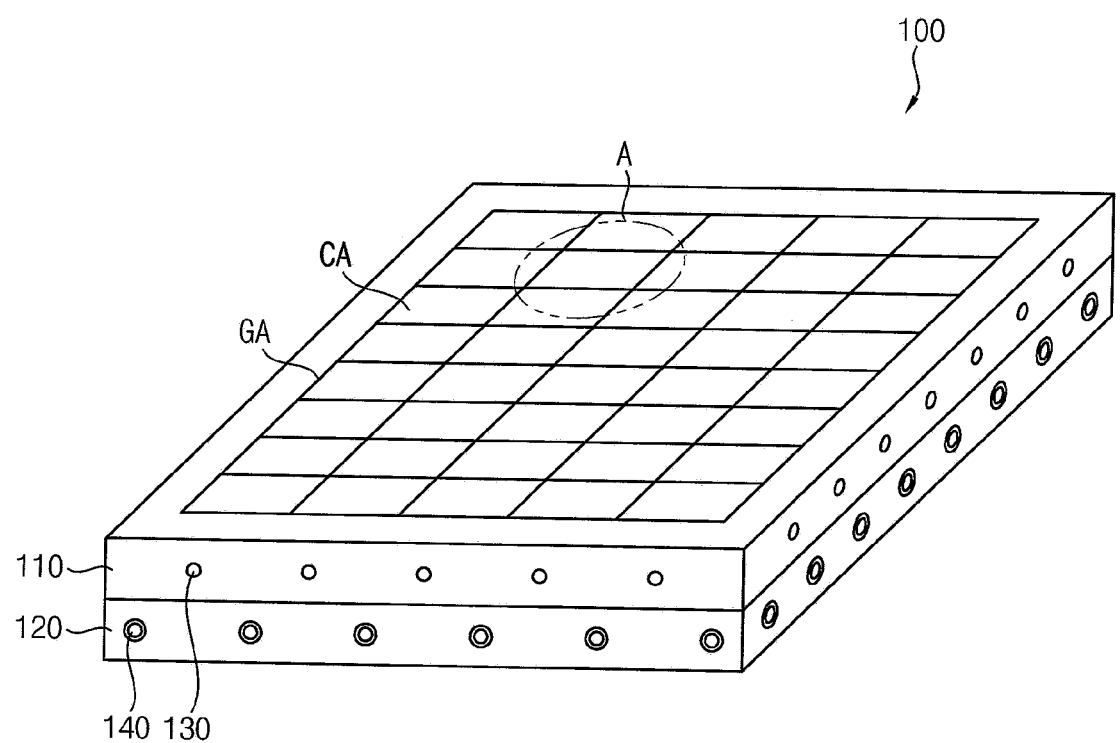
FIG. 1 is a perspective view illustrating a work table for laser processing according to exemplary embodiments of the present invention.

FIG. 1 is a perspective view illustrating a work table for laser processing according to exemplary embodiments of the present invention.

Referring to FIG. 1, a work table 100 for laser processing may include an upper plate 110 and a lower plate 120. The work table 100 may be used to perform laser processing. The work table 100 may be disposed on a base device. The work table 100 may be designed to accommodate a size of a substrate and a shape of the substrate. The substrate may be loaded on the work table 100. The work table 100 may fix the substrate thereto using one or more absorption holes through which vacuum pressure is applied. Further, the work table 100 may discharge particles and fumes generated during a laser cutting process using the absorption hole.

The upper plate 110 may include a plurality of cell regions CA and groove regions GA that divide the cell regions CA. At least one absorption hole that fixes the substrate may be formed in the cell region CA. At least one suction hole that sucks particles generated in the laser cutting process may be formed in the groove region GA.

The upper plate 110 may include a first surface that loads the substrate and a second surface that is combined with the lower plate 120. The plurality of cell regions CA and the groove regions GA that divide the cell regions CA may be formed on the first surface of the upper plate 110. The laser beam may cut the substrate along the groove regions GA. The absorption holes may be formed in the cell region CA of the upper plate 110. The absorption holes may be coupled to absorption paths formed by combining the upper plate 110 and the lower plate 120. The absorption paths may be coupled to an external absorption device through a first channel 130. Although the first channel 130 coupled to the upper plate 110 is depicted, the first channel 130 may be formed in the lower plate 120 or may be formed between the upper plate 110 and the lower plate 120. An absorptive force (e.g. a vacuum pressure) may be transferred to the absorption holes according to an operation of the external absorption device. For example, the absorption device may be a vacuum motor/pump. The absorptive force may be transferred to the cell region CA of the upper plate 110 through the absorption holes and the substrate may be accordingly fixed on the upper plate 110. The suction holes may be formed in the groove region GA of the upper plate 110. The suction holes may be coupled to a suction path. The suction path may be coupled to an external exhaust device through a second channel 140. A suction force may be transferred to the suction holes according to an operation of the external exhaust device. For example, the external exhaust device may include an inhalation motor and a dust collector. The suction force may be transferred to the groove regions GA of the upper plate 110 through the suction holes. Particles and fumes generated in a cutting process using the laser beam may be collected through the suction holes. A low-contamination surface treatment is performed on the groove regions GA, the suction holes, and the suction path. In some exemplary embodiments of the present invention, a surface of the groove regions GA, a surface of the suction holes, and a surface of the suction path may be coated with Teflon or Polyether ether ketone (Peek). When the low-contamination surface treatment is performed on the groove regions GA, the suction holes, and the suction path, residues of the particles or residues of the fumes might not remain on the groove regions GA, the suction holes, and the suction path. In some exemplary embodiments, a plurality of bumps may be formed on the surface of the groove regions GA, the surface of the suction holes, and the surface of the suction path. When the bumps are formed on the surface of the groove regions GA, the surface of the suction holes, and the surface of the suction path, the particles and fumes inhaled through the suction holes and the suction path may be collected on the bumps. A size of each suction hole may be the same or may be bigger than a size the absorption hole. The size of each suction hole may be at least large enough to pass the particles and the fumes therethrough.

The lower plate 120 may be disposed under the upper plate 110. The lower plate 120 may form the absorption path coupled to the absorption holes and the suction path coupled to the suction holes by combining with the upper plate 110.

The lower plate 120 may include a first surface combined with the upper plate 110 and a second surface loaded on the base device. The first surface of the lower plate 120 may form the absorption path and the suction path by combining with the second surface of the upper plate 110. In some exemplary embodiments of the present invention, the absorption path may be formed by combining a concave part formed on the second surface of the upper plate 110 and a concave part formed on the first surface of the lower plate 120. In some exemplary embodiments of the present invention, the absorption path may be formed by combining a concave part formed on the second surface of the upper plate 110 and a flat part of the first surface of the lower plate 120. The absorption path may be coupled to the external absorption device through the first channel 130 formed in a side of the upper place 110 or the lower place. The absorption path may transfer the absorptive force to the absorption holes, according to the external absorption device. A manifold may be formed between the absorption path and the external absorption device in order to lead inhalation to the absorption holes. The suction path may be formed in the lower plate 120. For example, the suction path may be formed on the lower plate 120 using gun drill processing. The suction path may couple the suction holes formed in the groove regions GA. The suction path may be coupled to the external exhaust device. The suction path may transfer the suction force to the suction holes according to the operation of the external exhaust device. A manifold may be disposed between the suction path and the external exhaust device in order to lead exhaust to the suction hole. A pressure of the absorption path and a pressure of the suction path may be different from each other. For example, the pressure of the absorption path may be greater (e.g., have more vacuum force) than the pressure of the suction path in order to increase the adhesive force of the substrate.

The work table 100 for laser processing may further include a seal block 150 (see FIGS. 3A-4B) that seals the suction hole. The seal block 150 may block air flow into the suction path. The seal block 150 may be formed between the second surface of the upper plate 110 and the first surface of the lower plate 120. For example, the seal block 150 may be implemented as an O-ring that includes elastic material and may be inserted into a groove part formed in the first surface of the lower plate 120. A combining member such as a clamp may be formed on the second surface of the lower plate 120 in order to combine with the base device.

The suction path may be coupled to an external blower in performing a cleaning of the work table 100. The blower may provide air or material having positive pressure to the suction holes in an opposite direction to the air provided from the exhaust device coupled to the suction holes during the cutting process. Thus, the particles and fumes accumulated in the suction holes may be removed. Here, the external blower may ionize the particles and the fumes in the suction path. For example, the external blower may ionize the particles and the fumes on the surface of the suction path by spraying nitrogen (N) to the suction path. The particles and the fumes, once ionized, may be more easily detached from the surface of the suction path because adhesion of the particles and the fumes may become weak. Further, the work table 100 for laser processing may remove the particles and fumes in the groove regions GA using an ultrasonic wave cleaning technique.

As described above, the suction holes may be formed in the groove regions GA of the work table 100. The work table 100 for laser processing may reduce contamination of the substrate generated in the cutting process using the laser beam by exhausting the particles and fumes generated in the grove region GA through the suction holes. Further, process efficiency may be increased by performing a prolonged cleaning cycle on the work table 100.

Figure 2:
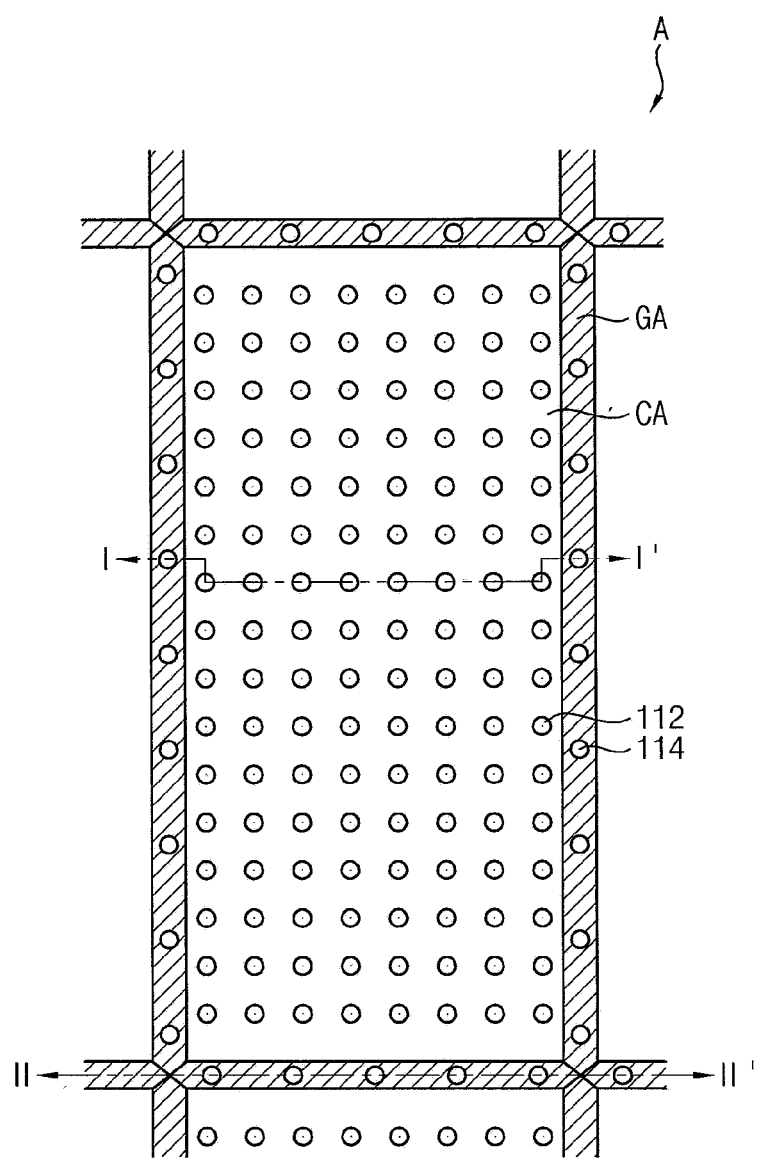
FIG. 2 is a plane view illustrating region A of FIG. 1 according to exemplary embodiments of the present invention.
Figure 3A:
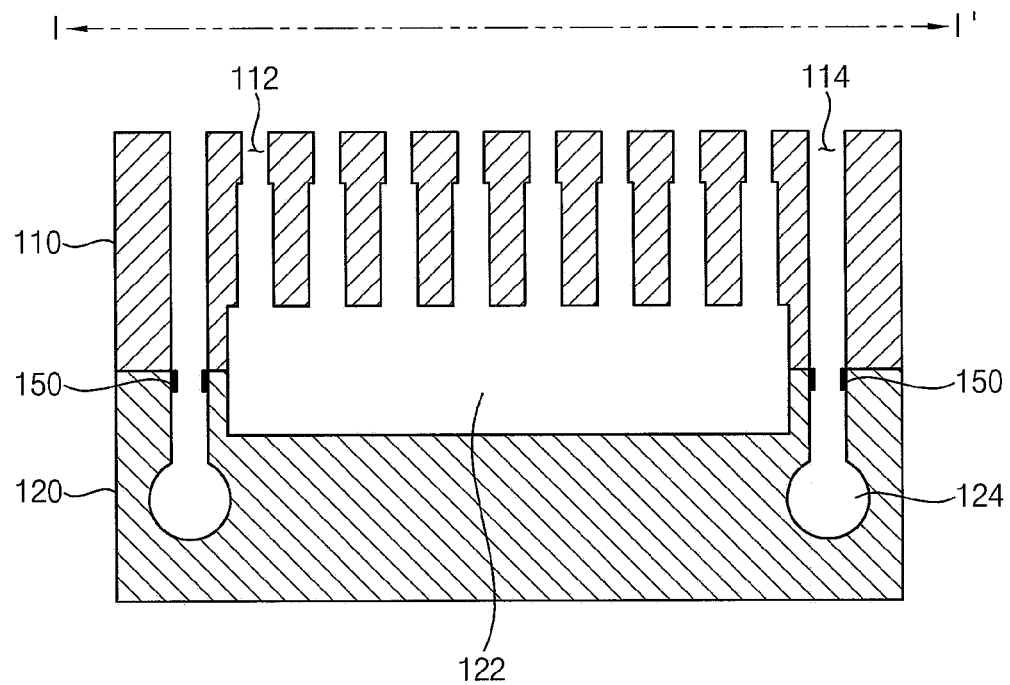
FIG. 3A is a cross-sectional view illustrating a work table taken along section line I-I' of FIG. 2 according to exemplary embodiments of the present invention.
Figure 3B:
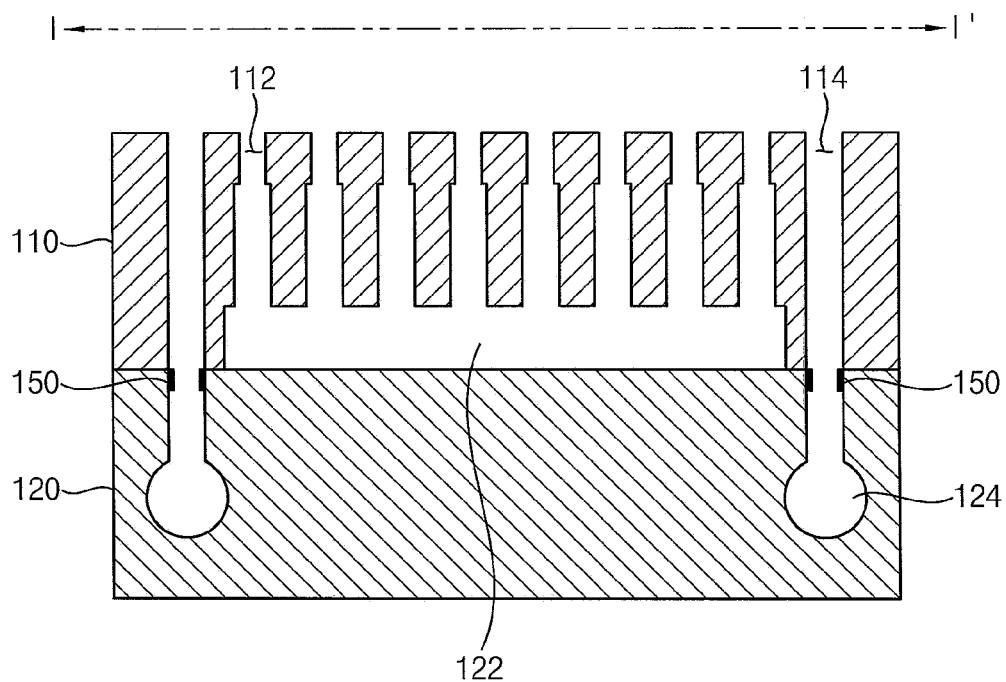
FIG. 3B is a cross-sectional view illustrating a work table taken along section line I-I' of FIG. 2 according to exemplary embodiments of the present invention.

FIG. 2 is a plane view illustrating the region A of FIG. 1. FIG. 3A is a cross-sectional view illustrating an exemplary embodiment of the present invention taken along section line I-I' of FIG. 2 and FIG. 3B is a cross-sectional view illustrating an exemplary embodiment of the present invention taken along section line I-I' of FIG. 2.

Referring to FIG. 2, the first surface of the upper plate 110 may include the cell region CA and the groove region GA.

The substrate may be loaded on the first surface of the upper plate 110. The laser beam may be directed to the substrate along the groove region GA.

The plurality of absorption holes 112 may be formed in the cell region CA. Although the absorption holes 112 having regular spacing are described in FIG. 2, the absorption holes 112 are not limited to having regular spacing. For example, the absorption holes 112 may have irregular spacing. The absorption holes 112 may be coupled to the absorption path 122 as described in FIGS. 3A and 3B. The absorption path 122 may be formed by combining the concave part of the upper plate 110 coupled to the absorption holes 112 and the concave part of the lower plate 120 as described in FIG. 3A. The absorption path 122 may be formed by combining the concave part of the upper plate 110 coupled to the absorption holes 112 and the flat part of the lower plate 120. The absorption path 122 may be coupled to the external absorption device through the first channel 130 formed on the side of the upper plate 110 or the lower plate 120. The absorption device may transfer the absorptive force to the absorption holes 112 through the absorption path 122.

The plurality of suction holes 114 may be formed in the groove regions GA. The low-contamination surface treatment may be performed on the groove region GA. For example, the groove regions GA may be coated with Teflon or Polyether ether ketone (Peek). Although the suction holes 114 having regular spacing are described in FIG. 2, the suction holes 114 are not limited thereto. For example the suction holes 114 may have irregular spacing. The suction holes 114 may be coupled to the suction path 124 as described in FIGS. 3A and 3B. The suction path 124 may be formed in the lower plate 120 using gun drill processing. The suction path 124 may be coupled to the external exhaust device through the second channel 140 formed in the side of the lower plate 120. The exhaust device may transfer suction force to the suction holes through the suction path 124. The low-contamination surface treatment may be performed on the suction holes 114 and the suction path 124. For example, the suction holes 114 and the suction path 124 may be coated with Teflon or Polyether ether ketone (Peek). The particles and fumes might not remain on the suction holes 114 and the suction path 124 when the low-contamination surface treatment is performed on the suction holes 114 and the suction path 124. The bumps may be formed on the surface of the suction holes 114 and the suction path 124. The particles and fumes may be collected on the bumps 160 when the bumps are formed on the surface of the suction holes 114 and the suction path 124.

Referring to FIG. 3A, the upper plate 110 may be stacked on the lower plate 120. The absorption path 122 and the suction path 124 may be formed by combining the upper plate 110 and the lower plate 120. As described in FIG. 3A, the absorption path 122 may be formed by combining the concave part of the upper plate 110 and the concave part of the lower plate 120. The absorption path 122 may be coupled to the absorption holes 112. The absorption path 122 may be coupled to the first channel 130 formed in the side of the upper plate 110 or the lower plate 120. The absorption path 122 may transfer the absorptive force to the absorption holes 112. The suction path 124 may be formed in the lower plate 120 using gun drill processing. The suction path 124 may be coupled to the suction holes 112 of the upper plate 110. The suction path 124 may be coupled to the second channel 140 formed in the side of the lower plate 120. The suction path 124 may transfer the suction force to the suction holes 114. The seal block 150 that seals the air flow into the suction path 124 may be formed. The seal block 150 may be formed between the upper plate 110 and the lower plate 120. For example, the seal block may include an elastic O-ring that may be inserted into a groove part formed in the lower plate 120.

Referring to FIG. 3B, the upper plate 110 may be stacked on the lower plate 120. The absorption path 122 and the suction path 124 may be formed by combining the upper plate 110 and the lower plate 120. As described in FIG. 3B, the absorption path 122 may be formed by combining the concave part of the upper plate 110 and the flat part of the lower plate 120. The absorption path 122 may be coupled to the absorption holes 112. The absorption path 122 may be coupled to the first channel 130 formed in the side of the upper plate 110 or the lower plate 120. The absorption path 122 may transfer the absorptive force to the absorption holes 112. The suction path 124 may be formed in the lower plate 120 using gun drill processing. The suction path 124 may be coupled to the suction holes 112 of the upper plate 110. The suction path 124 may be coupled to the second channel 140 formed in the side of the lower plate 120. The suction path 124 may transfer the suction force to the suction holes 114. The seal block 150 that seals the air flow into the suction path 124 may be formed. The seal block 150 may be formed between the upper plate 110 and the lower plate 120. For example, the seal block may include an elastic O-ring that may be inserted into a groove part formed in the lower plate 120.

Figure 4A:
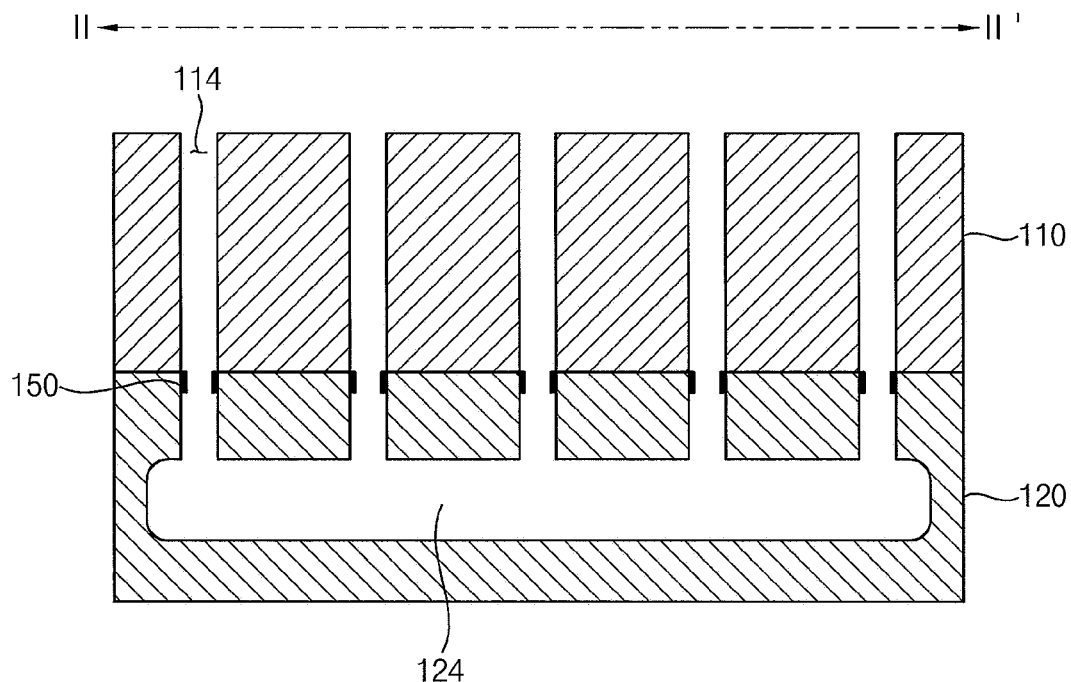
FIG. 4A is a cross-sectional view illustrating a work table taken along section line II-II' of FIG. 2 according to exemplary embodiments of the present invention.
Figure 4B:
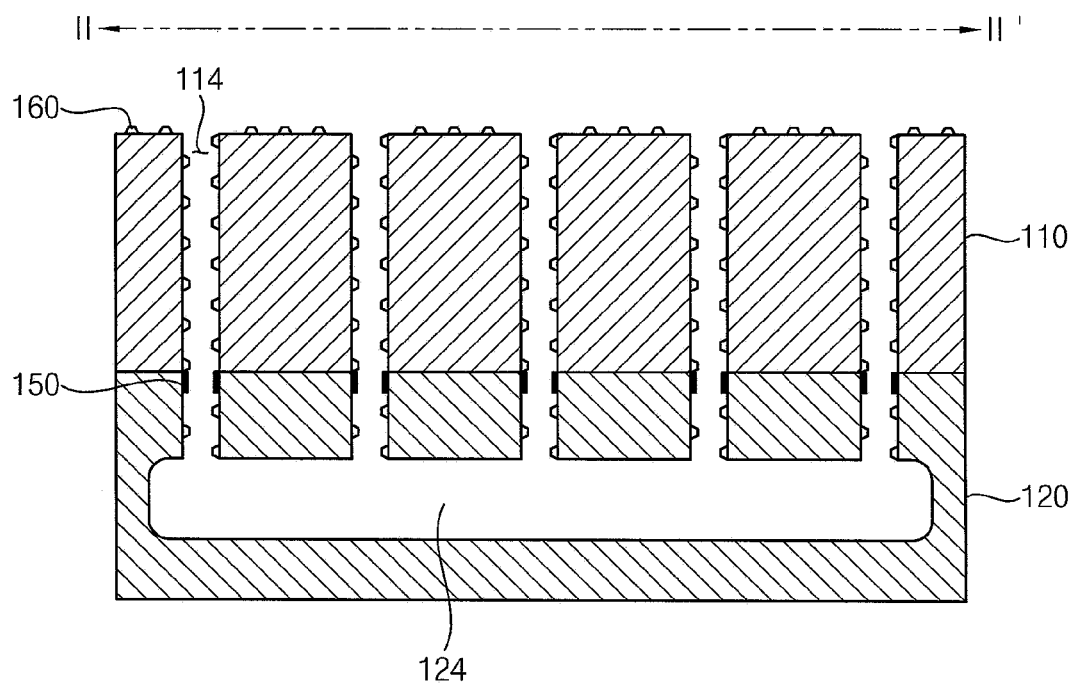
FIG. 4B is a cross-sectional view illustrating a work table taken along section line II-II' of FIG. 2 according to exemplary embodiments of the present invention.

FIG. 4A is a cross-sectional view illustrating section line II-II' of FIG. 2 and FIG. 4B is a cross-sectional view illustrating section line II-II' of FIG. 2, in accordance with exemplary embodiments of the present invention.

Referring to FIGS. 4A and 4B, the plurality of suction holes 114 may be formed in the groove region GA of the upper plate 110. The plurality of suction holes 114 may be coupled to the suction path 124 formed in the lower plate 120. The suction path 124 may be formed using gun drill processing. The suction path 124 may be coupled to the external exhaust device. The suction path 124 may transfer the suction force to the suction holes 114 according to the operation of the external exhaust device. For example, the external exhaust device may include an inhalation motor and a dust collector. Further, the suction path 124 may be coupled to the external blower in the cleaning process of the work table 100. The blower may provide air or material having positive pressure to the suction holes in an opposite direction to the air provided from the exhaust device coupled to the suction holes during the cutting process. Thus, the particles and fumes accumulated in the suction holes may be removed. Here, the external blower may ionize the particles and the fumes in the suction path. For example, the external blower may ionize the particles and the fumes on the surface of the suction path by spraying nitrogen (N) to the suction path. The particles and the fumes, once ionized, may be more easily detached from the surface of the suction path because adhesion of the particles and the fumes may be weakened. Further, the work table 100 for laser processing may remove the particles and fumes in the groove region GA using ultrasonic wave cleaning.

The low-contamination surface treatment may be performed on the groove region GA, the suction holes 114, and the suction path 124. As described in FIG. 4B, the bumps 160 may be formed on the surface of the groove region GA, the surface of the suction holes 114, and the surface of the suction path 124. When the bumps are formed on the surface of the groove region GA, the surface of the suction holes 114, and the surface of the suction path 124, the particles and fumes inhaled through the suction holes 114 and the suction path 124 may be collected on the bumps 160. Although bumps 160 having trapezoidal shape is illustrated in FIG. 4B, the shape of the bumps 160 is not limited thereto. For example, the bumps 160 may have a triangle shape, a square shape, a hemisphere shape, cylinder shape, etc. Further, although the work table 100 having bumps 160 formed on the surface of the groove region GA, the surface of the suction holes 114, and the surface of the suction path 124 is illustrated in FIG. 4B, the low-contamination surface treatment is not limited thereto. For example, the surface of the groove region GA, the surface of the suction holes 114, and the surface of the suction path 124 may be coated with Teflon or Polyether ether ketone (Peek). When the surface of the groove region GA, the surface of the suction holes 114, and the surface of the suction path 124 are coated with Teflon or Polyether ether ketone (Peek), residues of the particles or residues of the fumes might not remain on the groove region GA, the suction holes 114, or the suction path 124. Further, concave parts may be formed on the surface of the groove region GA, the surface of the suction holes 114, and the surface of the suction path 124. When the groove region GA, the suction holes 114, and the suction path 124 have the concave parts, the particles and fumes may be collected in the concave parts.

Figure 5:
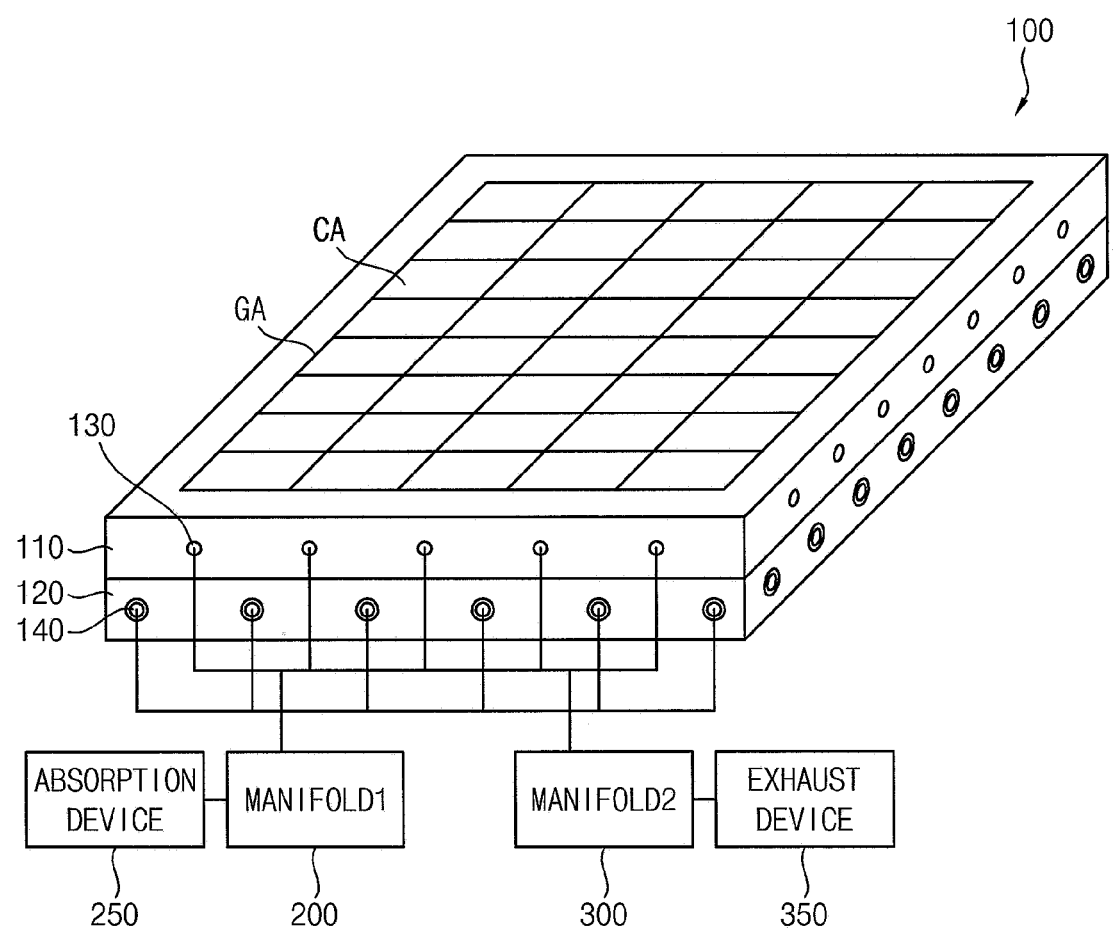
FIG. 5 is a diagram illustrating the work table for laser processing of FIG. 1 according to exemplary embodiments of the present invention.

FIG. 5 is a diagram illustrating the work table for laser processing of FIG. 1.

Referring to FIG. 5, the work table 100 for laser processing may be coupled to a first manifold 200 and a second manifold 300. The work table 100 for laser processing may have the first channel 130 and the second channel 140 on the side of the upper plate 110 and the lower plate 120. The first channel 130 may be coupled to the absorption path 122 formed on the work table 100 for laser processing. The first channel 130 may be coupled to the first manifold 200. The first manifold 200 may be coupled to the absorption device 250. The first manifold 200 may control an amount of air flow into the absorption path 122. The absorptive force may be transferred to the absorption holes 112 according to the operation of the absorption device 250. For example, the absorption device may be a vacuum motor. The absorptive force may be transferred to the cell region CA of the upper plate 110 through the absorption hole, and then the substrate may be fixed on the upper plate 110. The second channel 140 may be coupled to the suction path 124 formed on the work table 100 for laser processing. The second channel 140 may be coupled to the second manifold 300. The second manifold may be coupled to the exhaust device 350. The second manifold 300 may control an amount of air flow into the suction path 124. The suction force may be transferred to the suction holes 114 according to the operation of the exhaust device 350. For example, the exhaust device 350 may be implemented as the inhalation motor and the dust collector. The suction force may be transferred to the groove region GA of the upper plate 110 through the suction holes 114, and then the particles and the fumes generated in the cutting process using the laser beam may be removed.

The second manifold 300 may be coupled to the blower in the cleaning process of the work table 100 for laser processing. The air may be transferred to the suction holes 114 according to the operation of the blower, and then the particles and fumes accumulated on the suction path 124 and the suction holes 114 may be removed. For example, the particles and fumes may be ionized by nitrogen (N) that may be sprayed from the blower. The particles and fumes may be more easily detached from the suction path 124 and the suction holes 114 because the adhesion force of the particles and fumes weaken. Alternatively, the blower may be directly coupled to the second channel 140.

Figure 6:
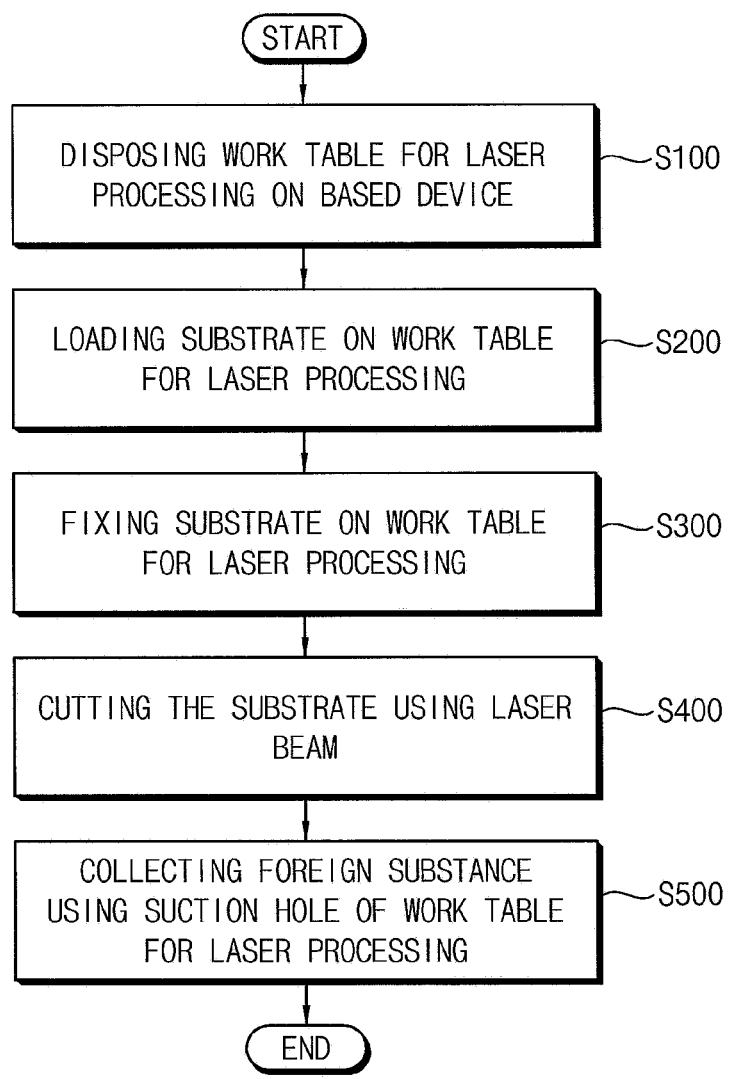
FIG. 6 is a flow chart illustrating a method of operating a work table for laser processing according to exemplary embodiments of the present invention.

FIG. 6 is a flow chart illustrating a method for operating a work table for laser processing according to exemplary embodiments of the present invention.

A method of operating a work table for laser processing may include a step of disposing the work table for laser processing onto a based device S100. A substrate may be loaded on to the work table for laser processing S200. The substrate may be fixed on the work table for laser processing using an absorption holes S300. The substrate may be cut using laser beam S400. Particles generated in the cutting process of the substrate may be collected using the suction holes S500.

The work table for laser processing may be disposed on the base device S100. The base device may be disposed in a space in which the laser processing is performed. The based device may support the work table for laser processing. The work table placed on the base device may be configured according to a size and a shape of the substrate.

The substrate may be loaded on the work table for laser processing S200. The substrate may be disposed on the work table for laser process according to align marks on the work table for laser processing.

The substrate may be fixed on the work table for laser processing using the absorption holes S300. The work table for laser processing may include cell regions. The plurality of absorption holes may be formed in the cell regions of the work table for laser processing. The absorption holes may be coupled to an absorption path formed by combining an upper plate and a lower plate, for example in the manner described above. The absorption path may be coupled to an external absorption device through a first channel. The absorptive force may be transferred to the absorption holes according to an operation of the absorption device. For example, the absorption device may be implemented as a vacuum motor. The absorptive force may be transferred to the cell region of the upper plate through the absorption hole, and then the substrate may be fixed on the work table for laser processing.

The substrate may be cut using the laser beam S400. The laser beam may be disposed above the work table for laser processing. For example, the substrate may be disposed between the laser beam and the work table for laser processing. The laser beam may be controlled according to a kind of laser processing being performed and/or by a kind of substrate used. The substrate nay be irradiated by the laser beam according to the groove region of the work table for laser processing.

The particles generated in the cutting process of the substrate using the laxer beam may be collected using the suction holes of the work table for laser processing S500. The work table for laser processing may include the groove region. The groove region may include the plurality of suction holes. The suction holes may be coupled to the suction path formed in the lower plate of the work table for laser processing using gun drill processing. The suction path may be coupled to an external exhaust device through the second channel. The suction force may be transferred to the suction holes according to an operation of the exhaust device. For example, the exhaust device may include an inhalation motor and a dust collector. The suction force may be transferred to the groove region of the upper plate through the suction hole, and then the particles and fumes generated in the cutting process of the substrate may be removed. Here, a low-contamination surface treatment may be performed on the groove region, suction hole, and suction path. In some exemplary embodiments of the present invention, the groove region, suction hole, and suction path may be coated with Teflon or Polyether ether ketone (Peek). When the groove region, suction hole, and suction path are coated with Teflon or Polyether ether ketone (Peek), residues of the particles or residues of the fumes might not remain on the groove region, the suction hole, and the suction path. In some exemplary embodiments of the present invention, a plurality of bumps may be formed on the surface of the groove region, the surface of the suction hole, and the surface of the suction path. When the bumps are formed on the surface of the groove region, the surface of the suction hole, and the surface of the suction path, the particles and fumes inhaled through the suction holes and the suction path may be collected on the bumps.

Figure 7:
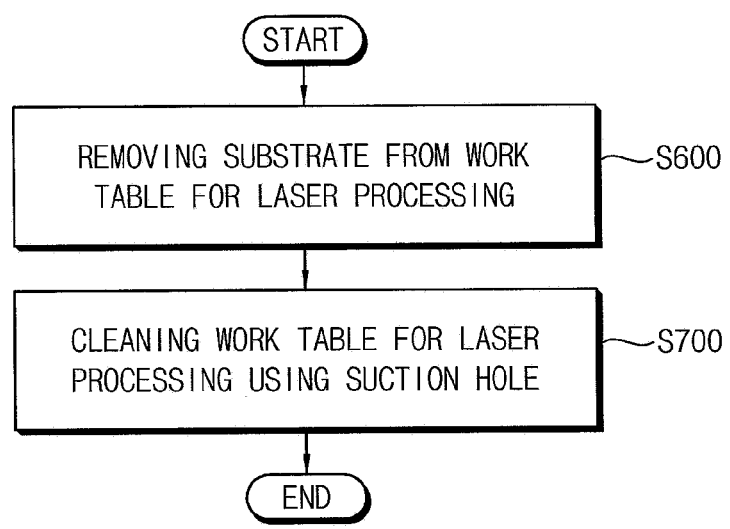
FIG. 7 is a flow chart illustrating a method for performing a cleaning operation for the work table for laser processing of FIG. 6 according to exemplary embodiments of the present invention.

FIG. 7 is a flow chart illustrating a method of cleaning the work table for laser processing of FIG. 6 in accordance with exemplary embodiments of the present invention.

The substrate may be divided into a plurality of cells by the cutting process. The divided substrate (for example, the cells) may be removed from the work table for laser processing after the cutting process S600. Here, the absorption device coupled to the absorption holes and the exhaust device coupled to the suction holes might not be operated.

The work table for laser processing may perform the cleaning process by coupling the blower to the suction path coupled to the suction holes S700. The suction path may be coupled to the blower in the cleaning process. The blower may provide air or a material having pressure to the suction holes in an opposite direction to the air provided from the exhaust device coupled to the suction holes during the cutting process. Thus, the particles and fumes accumulated in the suction holes may be removed. Here, the external blower may ionize the particles and the fumes in the suction path. For example, the external blower may ionize the particles and the fumes on the surface of the suction path by spraying nitrogen (N) to the suction path. The particles and the fumes, having been ionized, may be more easily detached from the surface of the suction path because adhesion of the particles and the fumes may be weakened.

As described above, the operation method of the work table for laser processing may reduce contamination of the substrate and the work table for laser processing by including the absorption holes and the suction holes on the work table for laser processing and removing the particles and fumes generated in the cutting process using the laser beam through the suction hole. Further, the cleaning process may be augmented using the suction holes.

The present inventive concept may be applied to a manufacturing device including a work table for laser processing. For example, the present inventive concept may be applied to a laser processing apparatus that cuts a substrate, a film, a glass, etc.

The foregoing is illustrative of exemplary embodiments of the present invention. Although a few exemplary embodiments of the present invention have been described, those skilled in the art will readily appreciate that many modifications are possible in the example embodiments without materially departing from the novel teachings and aspects of the present inventive concept.

What is claimed is:

1. A work table for laser processing comprising:
an upper plate including a plurality of cell regions and at least one groove region that divides the plurality of cell regions, the upper plate including a plurality of absorption holes that fix a substrate in the plurality of cell regions, and a plurality of suction holes that collect particles generated during a cutting process performed on the substrate; and
a lower plate disposed under the upper plate, the lower plate forming an absorption path that is coupled to the plurality of absorption holes, and a suction path coupled to the plurality of suction holes by combining the lower plate with the upper plate.

2. The work table for laser processing of claim 1, further comprising: a seal block configured to seal the suction path.

3. The work table for laser processing of claim 1, wherein a low-contamination surface treatment is performed on the groove region, the plurality of suction holes, and the suction path.

4. The work table for laser processing of claim 3, wherein a surface of the groove region, a surface of the plurality of suction holes, and a surface of the suction path are coated with Polyether ether ketone (Peek).

5. The work table for laser processing of claim 1, wherein the absorption path is coupled to an external absorption device.

6. The work table for laser processing of claim 5, wherein a manifold is disposed between the absorption path and the external absorption device.

7. The work table for laser processing of claim 1, wherein the suction path is coupled to an external exhaust device.

8. The work table for laser processing of claim 7, wherein a manifold is disposed between the suction path and the external exhaust device.

9. The work table for laser processing of claim 1, wherein the suction path is formed using gun drill processing.

10. The work table for laser processing of claim 1, wherein a size of each of the plurality of absorption holes is bigger than a size of each of the plurality of suction holes.

11. The work table for laser processing of claim 1, wherein the substrate is cut along the groove region.

12. The work table for laser processing of claim 1, wherein a pressure of the absorption path is stronger than a pressure of the suction path.

13. The work table for laser processing of claim 1, wherein the suction path is coupled to an external blower in a cleaning process of the work table for laser processing.

14. A work table for laser processing comprising:
an upper plate including a plurality of cell regions and at least one groove region that divides the plurality of cell regions, the upper plate including a plurality of absorption holes that fix a substrate in the plurality of cell regions, and a plurality of suction holes that collect particles generated during a cutting process performed on the substrate; and
a lower plate disposed under the upper plate, the lower plate forming an absorption path that is coupled to the plurality of absorption holes, and a suction path coupled to the plurality of suction holes by combining the lower plate with the upper plate,
wherein a low-contamination surface treatment is performed on the groove region, the plurality of suction holes, and the suction path, and
wherein a plurality of bumps is disposed on a surface of the groove region, a surface of the plurality of suction holes, and a surface of the suction path.

15. A work table for laser processing comprising:
an upper plate including a plurality of cell regions and at least one groove region that divides the plurality of cell regions, the upper plate including a plurality of absorption holes that fix a substrate in the plurality of cell regions, and a plurality of suction holes that collect particles generated during a cutting process performed on the substrate; and a lower plate disposed under the upper plate, the lower plate forming an absorption path that is coupled to the plurality of absorption holes, and a suction path coupled to the plurality of suction holes by combining the lower plate with the upper plate, wherein the suction path is coupled to an external blower in a cleaning process of the work table for laser processing, and wherein the external blower ionizes the particles in the suction path.

\* \* \* \* \*